Nov. 29, 1960 R. O. DECKER 2,962,653
MAGNETIC AMPLIFIER SYSTEM
Filed April 8, 1957
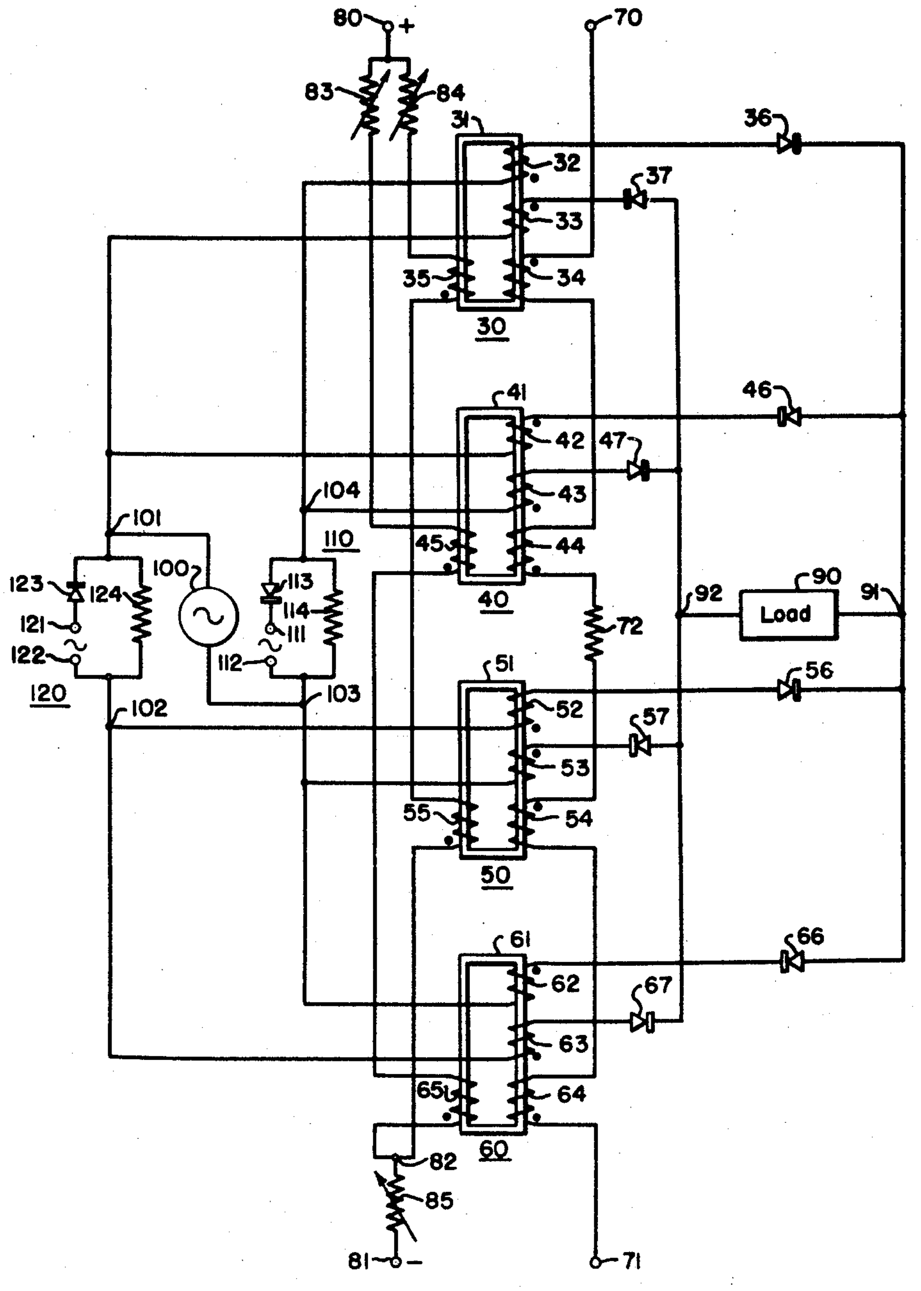
WITNESSES:
Bernard R. Giegucz
Myron E. Click
INVENTOR
Richard O. Decker
BY
F. E. Browder
ATTORNEY

United States Patent Office 2,962,653

Patented Nov. 29, 1960

2,962,653

MAGNETIC AMPLIFIER SYSTEM

Richard O. Decker, Murrysville, Pa., assignor to Westinghouse Electric Corporation, East Pittsburgh, Pa., a corporation of Pennsylvania Filed Apr. 8, 1957, Ser. No. 651,474

9 Claims. (Cl. 323—89)

This invention relates to magnetic amplifier systems in general and, in particular, to magnetic amplifier systems with a reversible direct current output.

Up to this time the most widely used method of obtaining a reversible direct current output from magnetic amplifier systems, without auxiliary switching devices, such as ignitrons, transistors or mechanical switches, was that of using a mixing resistor network. The mixing resistor network, as is well known in the art, has a maximum efficiency of approximately 17%. Efficiency, here, is defined as a ratio of load power to power delivered to the terminals of the mixing resistor network. Under any conditions the maximum current which must be carried by the magnetic amplifier is always larger than the maximum current which flows through the load. In large power applications this excessive current produces a large amount of internal heating in the cores.

It is an object of this invention to provide an improved magnetic amplifier system.

Another object of this invention is to provide an improved magnetic amplifier system with a higher power efficiency ratio and a lower internal dissipation.

Other objects of this invention will become apparent from the following description when taken in conjunction with the accompanying drawing. In said drawing, for illustrative purposes only, there is shown a preferred form of this invention.

The figure is a schematic diagram illustrating a magnetic amplifier system with a reversible direct current output embodying the teachings of this invention.

Referring to the figure, there is illustrated a magnetic amplifier system with a reversible direct current output. In general, this magnetic amplifier system comprises four magnetic amplifiers 30, 40, 50 and 60, a main alternating current source 100, a pair of auxiliary source networks 110 and 120, and a load 90.

The magnetic amplifier 30 includes a magnetic core member 31, a pair of load windings 32 and 33, a control winding 34 and a bias winding 35. The windings 32, 33, 34 and 35 are inductively disposed on magnetic core member 31.

The magnetic amplifier 40 includes a magnetic core member 41, a pair of load windings 42 and 43, a control winding 44 and a bias winding 45. The windings 42, 43, 44 and 45 are inductively disposed on the magnetic core member 41.

The magnetic amplifier 50 includes a magnetic core member 51, a pair of load windings 52 and 53, a control winding 54 and a bias winding 55. The windings 52, 53, 54 and 55 are inductively disposed on the magnetic core member 51.

The magnetic amplifier 60 includes a magnetic core member 61, a pair of load windings 62 and 63, a control winding 64 and a bias winding 65. The windings 62, 63, 64 and 65 are inductively disposed on the magnetic core member 61.

Connected in series circuit relationship between terminals 104 and 101 are the load winding 32 of the magnetic amplifier 30, a rectifier 36, the load 90, a rectifier 37 and the load winding 33 of the magnetic amplifier 30.

Connected in series circuit relationship between terminals 104 and 101 also are the load winding 43 of the magnetic amplifier 40, a rectifier 47, the load 90, a rectifier 46 and the load winding 42 of the magnetic amplifier 40.

Connected in series circuit relationship between terminals 102 and 103 are the load windings 52 of the magnetic amplifier 50, a rectifier 56, the load 90, a rectifier 57 and the load winding 53 of the magnetic amplifier 50.

Also connected in series circuit relationship between terminals 102 and 103 are the load winding 63 of the magnetic amplifier 60, a rectifier 67, the load 90, a rectifier 66 and the load winding 62 of the magnetic amplifier 60.

The main alternating current-voltage source 100 is connected to the terminals 101 and 103. The auxiliary source network 110 is connected to the terminals 103 and 104. The auxiliary source network 110 consists of two parallel branches, one branch of which includes a pair of terminals 111 and 112 for connecting an auxiliary alternating current-voltage source to the network 110 and a rectifier 113, the other branch including a resistor 114. The auxiliary source network 120 is connected to the terminals 101 and 102. The auxiliary source network 120 consists of two parallel branches, one branch including a pair of terminals 121 and 122 for connecting an auxiliary alternating current-voltage to the network source 120 and a rectifier 123, the other branch including a resistor 124.

A control circuit for the magnetic amplifier system is connected to terminals 70 and 71 and includes the control windings 34, 44, 54 and 64 of the magnetic amplifiers 30, 40, 50 and 60 respectively and a resistor 72 connected in series circuit relationship. The resistor 72 serves to limit current flow in the said control windings.

A bias circuit for the magnetic amplifier system is connected between terminals 80 and 81. The bias circuit consists of two parallel branches, one branch of which includes an adjustable resistor 83, the bias winding 45 of the magnetic amplifier 40 and the bias winding 65 of the magnetic amplifier 60, the other branch of which includes an adjustable resistor 84, the bias winding 35 of the magnetic amplifier 30 and the bias winding 55 of the magnetic amplifier 50. These two branches are connected to terminals 80 and 82. A main bias adjustable resistor 85 is connected between terminals 81 and 82. The bias resistors 83 and 84 are adjustable to balance the four magnetic core members 31, 41, 51 and 61 at null. The main bias resistor 85 is adjustable so that all magnetic core members 31, 41, 51 and 61 can be set to saturate sometime during a firing half-cycle, that is, so that they can operate class A.

The operation of the system can be divided into two portions. When the control terminal 70 is at a positive polarity with respect to the control terminal 71, the magnetic amplifiers 30 and 50 operate to supply direct current to the load 90. When the control terminal 71 is at a positive polarity with respect to the control terminal 70, the magnetic amplifiers 40 and 60 operate to supply direct current to the load 90.

Assume that the magnetic core members 31, 41, 51, and 61 are biased, by the proper amount of current flow from the terminal 80 to the terminal 81 in the bias circuit, to give half output upon application of the main alternating current-voltage source 100 to the respective load windings, with no signal present at the control terminals 70 and 71. Assume that the control terminal 70 is at a positive polarity with respect to the control terminal 71. All windings in the magnetic amplifier system have been furnished with polarity dots, that is, when current flows into the winding through the polarity dot the magnetic core member with which the winding is inductively associated will tend to saturate and when the current is flowing out of the winding through the polarity dot, the magnetic core member with which the winding is inductively associated will tend to desaturate. Thus, with the polarity of control signal described above, it can be seen that this flow of signal current into the control windings 34, 44, 54 and 64 will oppose the bias ampere-turns in the magnetic core members 31 and 51 and aid the bias ampere-turns in the magnetic core members 41 and 61. Therefore, the magnetic core members 31 and 51 tend to become saturated and the magnetic core members 41 and 61 tend to desaturate and remain cut off.

On the first half-cycle of the main alternating current-voltage source 100 when the terminal 103 is at a positive polarity with respect to the terminal 101, the magnetic core members 31 and 41 will be in their gating half-cycle since the supply voltage is positive in the direction of the self-saturating rectifiers 36, 37 and 47, 46 associated with the load windings 32, 33 and 43, 42 of these magnetic core members. Because of the assumed polarity, above, of the control signal, the magnetic core member 31 will saturate before the magnetic core member 41. Therefore, current flow for this half-cycle of the main alternating current-voltage source 100 will be from the terminal 103 through the resistor 114, the load winding 32 of the magnetic amplifier 30, the rectifier 36, the load 90, the rectifier 37 and the load winding 33 of the magnetic amplifier 30 to the terminal 101. This will cause a voltage drop across the load winding 32 of magnetic amplifier 30, the load 90 and load winding 33 of the magnetic amplifier 30. The load voltage, instantaneously, assuming no drop in the load windings 32 and 33 of the magnetic amplifier 30, will then be $$E_{90}=\frac{(E_{100})(R_{90})}{(R_{90}+R_{114})}$$

The voltage which must be supported by each of the load windings 42 and 43 of the magnetic amplifier 40 is also $$E_{90}=\frac{(E_{100})(R_{90})}{(R_{90}+R_{114})}$$

Thus, although the voltage across load 90 is reduced because of the resistor 114, the voltage which must be supported by the load windings 42 and 43 on the magnetic core member 41 is also reduced as compared to that voltage supported by a load winding of a magnetic amplifier of the prior art using a mixing resistor load network. Thus, economy of material is preserved. In a comparable mixing resistor network circuit the maximum current flowing in the load windings is three times the maximum current flowing in the load. Thus, the internal power dissipation of a comparable magnetic amplifier of the prior art is nine times as great as that of the present invention.

The resistor 114 also serves to limit the heavy circulating currents which will exist if the load windings 42 and 43 drive the magnetic core member 41 to saturation during this half-cycle. It can be seen that for this half-cycle the magnetic core members 31 and 41 with their respective load windings 32, 33 and 42, 43 form a bridge that is balanced when both of the magnetic core members 31 and 41 are unsaturated or when both are saturated.

It is to be noted that the auxiliary alternating current-voltage sources that are to be connected to the terminals 111 and 112 of the auxiliary source network 110 and the terminals 121 and 122 of the auxiliary source network 120 are of the same frequency as the alternating current-voltage source 100. Their phasing will be explained hereinafter.

During this same half-cycle of the main alternating current-voltage source 100 in which the current from the said source 100 is flowing through resistor 114, the auxiliary source network 110 is inoperative. The auxiliary alternating current-voltage source as applied to the terminals 111 and 112 during this half-cycle causes the terminal 111 to be at a positive polarity with respect to terminal 112 and current flow in the auxiliary source network 110 is blocked by the rectifier 113.

On this same half-cycle in which the current from the main alternating current-voltage source 100 is flowing through resistor 114, the auxiliary alternating current-voltage source connected to the terminals 121 and 122 of the auxiliary source network 120 is forcing current in the forward conducting direction of rectifier 123 through the resistor 124, creating a voltage drop across resistor 124. Terminal 121 is at a positive polarity with respect to terminal 122. This voltage drop is needed to aid in the resetting process taking place in magnetic core member 61.

For the polarity of control voltage assumed above, the flux in magnetic core member 61 is being reset by the combined action of the ampere-turns of the bias winding 65 and the control winding 64. This flux setting process in magnetic core member 61 is in such a direction as to induce a voltage in the load winding 63 that is positive in a forward conducting direction of rectifier 67. This voltage has an impedance across it of the saturated load winding 33 of magnetic core member 31 and resistor 124. If resistor 124 were not in the circuit (i.e. zero) then magnetic core member 61 would have a short circuit across it, except for the forward drop of the rectifiers 67 and 37 and the copper resistance of the load windings 63 and 33, and flux reset is very difficult, requiring an excessive amount of control and bias power. That is, the resetting signal, coming from the control ampere-turns of the control winding 64 and the bias ampere-turns of the bias winding 65, would be loaded down by the reflected low impedance.

Since magnetic core member 31 and magnetic core member 61 do not work together (i.e. when the magnetic core member 31 saturates early in one half-cycle, then magnetic core member 51 is desired to saturate early in the next half-cycle), it is desirable to reset the flux in magnetic core member 61 as much as possible if magnetic core member 31 saturates early.

Even with resistor 124 in this loop, reset of magnetic core member 61 is difficult because of the reflected load on the bias control circuits. The auxiliary alternating current-voltage source connected to terminals 121 and 122 of the auxiliary source network 120 is introduced as a blocking voltage to prevent the loading effect on the resetting of magnetic core member 61 after magnetic core member 31 saturates. The auxiliary alternating current-voltage connected to terminals 121 and 122 does not interfere in any way with magnetic core members 31 and 41 during their gating half-cycle. The auxiliary alternating current-voltage connected to terminals 111 and 112 of the auxiliary source network 110 has no influence during this half-cycle because of its associated blocking rectifier 113.

On the next half-cycle of the main alternating current-voltage source 100 when the terminal 101 is at a positive polarity with respect to the terminal 103, the magnetic core members 51 and 61 will be in their gating half-cycle since the supply voltage is positive in the direction of the self-saturating rectifiers 56, 57 and 66, 67 associated with the load windings 52, 53 and 62, 63 of these magnetic core members. Because of the assumed polarity, above, of the control signal, the magnetic core member 51 will saturate before the magnetic core member 61. Therefore, current flow for this half-cycle of the alternating current-voltage source 100 will be from the terminal 101 through resistor 124, the load winding 52 of the magnetic amplifier 50, the rectifier 56, the load 90, the rectifier 57 and the load winding 53 of the magnetic amplifier 50 to the terminal 103.

This will cause a voltage drop across the load winding 52 of the magnetic amplifier 50, the load 90 and the load winding 53 of the magnetic amplifier 50. The load voltage, instantaneously, assuming no drop in the load windings 52 and 53 of the magnetic amplifier, will then be $$E_{90}=\frac{(E_{100})(R_{90})}{(R_{90}+R_{114})}$$

The voltage which must be supported by each of the load windings 62 and 63 of the magnetic amplifier 60 is also $$E_{90}=\frac{(E_{100})(R_{90})}{(R_{90}+R_{114})}$$

Thus, although the voltage across load 90 is reduced because of the resistor 124, the voltage which must be supported by the load windings 42 and 43 on the magnetic core member 41 is also reduced as compared to that voltage supported by a load winding on a magnetic core member of a magnetic amplifier of the prior art using a mixing resistor load network. Thus, economy of material is preserved. In a comparable mixing resistor network circuit, the maximum current flowing in the load windings is three times the maximum current flowing in the load. Thus, the internal power dissipation of a comparable magnetic amplifier of the prior art is nine times as great as that of the present invention.

The resistor 124 also serves to limit the heavy circulating currents which will exist if the load windings 62 and 63 drive the magnetic core member 61 to saturation during this half-cycle. It can be seen that for this half-cycle the magnetic core members 51 and 61 with their respective load windings 52, 53 and 62, 63 form a bridge that is balanced when both of the magnetic core members 51 and 61 are unsaturated or when both are saturated.

During this half-cycle of the alternating current-voltage source 100 in which the current from the said source 100 is flowing through resistor 124, the auxiliary source network 120 is inoperative. The auxiliary alternating current-voltage source as applied to the terminals 121 and 122 during this half-cycle causes the terminal 122 to be at a positive polarity with respect to terminal 121 and current flow is blocked by the rectifier 123. On this same half-cycle the auxiliary alternating current-voltage source connected to the terminals 111 and 112 of the auxiliary source network 110 is forcing current through the resistor 114 in the forward conducting direction of rectifier 113, creating a voltage drop across resistor 114. Terminal 112 is at positive polarity with respect to terminal 111. This voltage drop is needed to aid in the resetting process taking place in magnetic core member 41.

For the polarity of control voltage assumed above, the flux in magnetic core member 41 is being reset by the combined action of the ampere-turns of the bias winding 45 and the control winding 44. This flux setting process in magnetic core member 41 is in such a direction as to induce a voltage in the winding 43 in the forward conducting direction of rectifier 47. This voltage has an impedance across it of the saturated load winding 53 of magnetic core member 51 and resistor 114.

If the resistor 114 were not in the circuit (i.e. zero) then magnetic core member 41 would have a short circuit across it except for the forward drop of the rectifiers 47 and 57 and the copper resistance of the load windings 43 and 53 and flux reset could scarcely occur. That is, the resetting signal, coming from the control ampere-turns of the control winding 44 and the bias ampere-turns of the bias winding 45, would be loaded down by the reflected low impedance.

Since the magnetic core member 51 and magnetic core member 41 do not work together (i.e. when magnetic core member 51 saturates early in one half-cycle then magnetic core member 31 is desired to saturate early in the next half-cycle), it is desirable to reset the flux in magnetic core member 41 as much as possible if magnetic core member 51 saturates early.

Even with the resistor 114 in the circuit, reset of magnetic core member 41 is difficult because of the load imposed on the control circuit. The auxiliary alternating current-voltage connected to terminals 111 and 112 is introduced as a blocking voltage to prevent the loading effect on the resetting of magnetic core member 41 after magnetic core member 51 saturates. The auxiliary alternating current-voltage connected to terminals 111 and 112 does not interfere in any way with magnetic core members 51 and 61 during their gating half-cycle. The auxiliary alternating current-voltage connected to terminals 121 and 122 of auxiliary source network 120 has no influence during this half-cycle because of the blocking effect of the associated rectifier 123.

With the polarity of control voltage as assumed above, the magnetic amplifier system will continue to operate on succeeding alternate half-cycles as described above.

A change in the polarity of the control signal wherein terminal 71 becomes positive with respect to terminal 70 effects the operation in the following manner.

Assume that the magnetic core members 31, 41, 51 and 61 are biased, by the proper amount of current flow from the terminal 80 to the terminal 81 in the bias circuit, to give half output upon application of the main alternating current-voltage source 100 to the respective load windings, with no signal present to the control terminals 70 and 71. Using the polarity dot notation described above, it can be seen with the new assumed polarity of control signal that this flow of signal current into the control windings 64, 54, 44 and 34 will oppose the bias ampere-turns in the magnetic core members 41 and 61 and aid the bias ampere-turns in the magnetic core members 31 and 51. Therefore, the magnetic core members 41 and 61 tend to become saturated and the magnetic core members 31 and 51 tend to remain cut off.

An examination of the half-cycles of operation with the new polarity of control signal will show that for the first half-cycle of the main alternating current-voltage source 100 wherein terminal 103 is at a positive polarity with respect to terminal 101, the magnetic amplifier 40 will operate in almost an identical manner as magnetic amplifier 30 in supplying load 90. The only difference is that rectifiers 46 and 47 are so connected to the load windings of the magnetic amplifier 40 that the output to the load 90 is reversed. Auxiliary source networks 110 and 120 function in the same manner as hereinbefore described for this particular half-cycle with the exception that the auxiliary source network 120 is blocking the voltage induced in load winding 52 of magnetic amplifier 50 by the resetting action in magnetic core member 51.

On the next half-cycle of alternating current-voltage source 100, when terminal 101 is at a positive polarity with respect to terminal 103, magnetic amplifier 60 is supplying the load 90 in almost the same fashion as was magnetic amplifier 50 when the control voltage was of the opposite polarity. The only difference is that rectifiers 66 and 67 are so connected to the load windings of the magnetic amplifier 60 that the output to the load 90 is reversed. Again auxiliary source networks 110 and 120 function as hereinbefore described with the exception that the auxiliary source network 110 is blocking the voltage induced in load winding 32 of magnetic amplifier 30 by the resetting action in the magnetic core member 31.

As long as the polarity of the control voltage at terminals 70 and 71 remains as assumed, the operation of the magnetic amplifier system will be the same for succeeding alternate half-cycles.

In conclusion, it is pointed out that while the illustrated example constitutes a practical embodiment of my invention, I do not limit myself to the exact details shown since certain modifications of the same may be varied without departing from the spirit of the invention.

I claim as my invention:

1. In a magnetic amplifier system, in combination, saturable means, a load circuit adapted to saturate said saturable means, means for connecting a load to said load circuit, means for connecting a main alternating current-voltage source to said load circuit, regulating means for said saturable means adapted to reset the amount of saturation of said saturable means, input means for said regulating means and a plurality of auxiliary source networks connected to the said load circuit for blocking voltages induced in said load circuit by the resetting action of the said regulating means.

2. In a magnetic amplifier system, in combination, saturable means, a load circuit adapted to saturate said saturable means, said load circuit including a plurality of load windings inductively disposed on said saturable means and rectifier means, means for connecting a load to said load circuit, means for connecting a main alternating current-voltage source to said load circuit, regulating means for said saturable means adapted to reset the amount of saturation of said saturable means, input means for said regulating means, and a plurality of auxiliary source networks connected to the said load circuit for blocking voltages induced in the said load circuit by the resetting action of the said regulating means.

3. In a magnetic amplifier system, in combination, saturable means, a load circuit adapted to saturate said saturable means, said load circuit including a plurality of split load windings inductively disposed on said saturable means and rectifier means, means for connecting a load to said load circuit, means for connecting a main alternating current-voltage source to said load circuit, regulating means for said saturable means adapted to reset the amount of saturation of said saturable means, input means for said regulating means, and a plurality of auxiliary source networks connected to the said load circuit for blocking voltages induced in the said load circuit by the resetting action of the said regulating means.

4. In a magnetic amplifier system, in combination, saturable means, a load circuit adapted to saturate said saturable means, said load circuit including a plurality of split load windings inductively disposed on said saturable means and rectifier means, means for connecting a load to said load circuit, means for connecting a main alternating current-voltage source to said load circuit, regulating means for said saturable means adapted to reset the amount of saturation of said saturable means, input means for said regulating means, and a plurality of auxiliary source networks connected to the said load circuit for blocking voltages induced in the said load circuit by the resetting action of the said regulating means, each of said auxiliary source networks including means for connecting an auxiliary alternating current-voltage to said auxiliary source network of substantially the same frequency as the main alternating current-voltage source.

5. In a magnetic amplifier system, in combination, saturable means, a load circuit adapted to saturate said saturable means, said load circuit including a plurality of split load windings inductively disposed on said saturable means and rectifier means, means for connecting a load to said load circuit, means for connecting a main alternating current-voltage source to said load circuit, regulating means for said saturable means adapted to reset the amount of saturation of said saturable means, said regulating means comprising a bias circuit and a control circuit, and a plurality of auxiliary source networks connected to the said load circuit for blocking voltages induced in the said load circuit by the resetting action of the said regulating means, each of said auxiliary source networks including means for connecting an auxiliary alternating current-voltage to said auxiliary source network of substantially the same frequency as the main alternating current-voltage source.

6. In a magnetic amplifier system, in combination, saturable means, a load circuit adapted to saturate said saturable means, said load circuit including a plurality of split load windings inductively disposed on said saturable means and rectifier means, means for connecting a load to said load circuit, means for connecting a main alternating current-voltage source to said load circuit, regulating means for said saturable means adapted to reset the amount of saturation of said saturable means, said bias circuit including a plurality of bias windings inductively disposed on said saturable means, means for connecting a constant polarity source to said bias winding and means for limiting current flow in said bias winding, said control circuit including a plurality of control windings inductively disposed on said saturable means, means for limiting current flow in said control windings and means for applying a signal to said control windings, said regulating means comprising a bias circuit and a control circuit, and a plurality of auxiliary source networks connected to the said load circuit for blocking voltages induced in the said load circuit by the resetting action of the said regulating means, each of said auxiliary source networks including means for connecting an auxiliary alternating current-voltage to said auxiliary source network of substantially the same frequency as the main alternating current-voltage source.

7. In a magnetic amplifier system, in combination, a plurality of saturable magnetic cores, a plurality of load windings inductively disposed on said saturable magnetic cores, rectifier means so connected to said load windings that a reversible direct-current output is delivered to a load, means for connecting a load to said load windings, means for connecting a main alternating current-voltage source to said load windings, regulating means for said saturable magnetic cores adapted to reset the amount of saturation in said saturable magnetic cores, input means for said regulating means, and a plurality of auxiliary source networks so connected to said load windings as to block voltages induced in the said load windings by the resetting action of the said regulating means.

8. In a magnetic amplifier system, in combination, a plurality of saturable magnetic cores, a plurality of load windings inductively disposed on said saturable magnetic cores, rectifier means so connected to said load windings that a reversible direct-current output is delivered to a load, means for connecting a load to said load windings, means for connecting a main alternating current-voltage source to said load windings, regulating means for said saturable magnetic cores adapted to reset the amount of saturation in said saturable magnetic cores, input means for said regulating means, and a plurality of auxiliary source networks so connected to said load windings as to block voltages induced in the said load windings by the resetting action of the said regulating means, each of said auxiliary source networks including means for connecting an auxiliary alternating current-voltage to said auxiliary source network of substantially the same frequency as the main alternating current-voltage source.

9. In a magnetic amplifier system, in combination, a plurality of saturable magnetic cores, a plurality of load windings inductively disposed on said saturable magnetic cores, rectifier means so connected to said load windings that a reversible direct-current output is delivered to a load, means for connecting a load to said load windings, means for connecting a main alternating current-voltage source to said load windings, regulating means for said saturable magnetic cores adapted to reset the amount of saturation in said saturable magnetic cores, said regulating means including a bias circuit and a control circuit, said bias circuit including a plurality of bias windings inductively disposed on said saturable means, means for connecting a constant polarity source to said bias winding and means for limiting current flow in said bias winding, said control circuit including a plurality of control windings inductively disposed on said saturable means, means for limiting current flow in said control windings and means for applying a signal to said control windings, and a plurality of auxiliary source networks so connected to said load windings as to block voltages induced in the said load windings by the resetting action of the said regulating means.

References Cited in the file of this patent

UNITED STATES PATENTS

| | | |
|---|---|---|
| 2,802,982 | Patton | Aug. 13, 1957 |
| 2,820,943 | Sanders | Jan. 21, 1958 |